United States Patent
Chang et al.

(10) Patent No.: US 10,761,982 B2
(45) Date of Patent: Sep. 1, 2020

(54) DATA STORAGE DEVICE AND METHOD FOR OPERATING NON-VOLATILE MEMORY

(71) Applicant: Silicon Motion, Inc., Jhubei, Hsinchu County (TW)

(72) Inventors: Ming-Hung Chang, Zhubei (TW); Fang-I Peng, Hsinchu (TW)

(73) Assignee: SILICON MOTION, INC., Jhubei, Hsinchu County (TW)

( * ) Notice: Subject to any disclaimer, the term of this patent is extended or adjusted under 35 U.S.C. 154(b) by 0 days.

(21) Appl. No.: 16/117,115

(22) Filed: Aug. 30, 2018

(65) Prior Publication Data
US 2019/0129850 A1 May 2, 2019

(30) Foreign Application Priority Data

Oct. 31, 2017 (TW) .............................. 106137606 A

(51) Int. Cl.
| | | |
|---|---|---|
| G06F 12/00 | (2006.01) | |
| G06F 12/08 | (2016.01) | |
| G06F 13/00 | (2006.01) | |
| G06F 12/0804 | (2016.01) | |
| G06F 12/02 | (2006.01) | |

(52) U.S. Cl.
CPC ...... G06F 12/0804 (2013.01); G06F 12/0246 (2013.01); *G06F 2212/1036* (2013.01); *G06F 2212/205* (2013.01); *G06F 2212/608* (2013.01); *G06F 2212/7201* (2013.01); *G06F 2212/7203* (2013.01)

(58) Field of Classification Search
USPC ........................................................ 711/141
See application file for complete search history.

(56) References Cited

U.S. PATENT DOCUMENTS

| | | | | |
|---|---|---|---|---|
| 5,701,516 A | * | 12/1997 | Cheng ................. | G06F 12/0866 710/22 |
| 6,418,510 B1 | * | 7/2002 | Lamberts .............. | G06F 3/0611 710/43 |
| 8,751,766 B2 | * | 6/2014 | Inoue .................... | G06F 3/0619 711/103 |
| 2008/0133654 A1 | * | 6/2008 | Kim ....................... | H04L 69/162 709/203 |
| 2011/0231710 A1 | * | 9/2011 | Laor ..................... | G06F 11/366 714/38.11 |
| 2012/0054541 A1 | * | 3/2012 | Byom ................. | G06F 11/0793 714/6.13 |

(Continued)

FOREIGN PATENT DOCUMENTS

TW 201510722 A 3/2015

*Primary Examiner* — Mohamed M Gebril
(74) *Attorney, Agent, or Firm* — McClure, Qualey & Rodack, LLP

(57) ABSTRACT

An efficient data storage device is disclosed, which uses a microprocessor and at least one volatile memory to operate a non-volatile memory. The microprocessor allocates the volatile memory to provide a cache area. According to an asynchronous event request (AER) issued by a host, the microprocessor uses the cache area to collect sections of write data requested by the host, programs the sections of write data collected in the cache area to the non-volatile memory together, and reports failed programming of the sections of write data to the host by AER completion information.

10 Claims, 4 Drawing Sheets

(56) References Cited

U.S. PATENT DOCUMENTS

| | | | |
|---|---|---|---|
| 2012/0173817 A1* | 7/2012 | Jiang | H04L 12/1877 |
| | | | 711/115 |
| 2014/0215129 A1* | 7/2014 | Kuzmin | G06F 12/0246 |
| | | | 711/103 |
| 2015/0067091 A1* | 3/2015 | Das | G06F 3/0655 |
| | | | 709/213 |
| 2015/0113224 A1* | 4/2015 | Achilles | G06F 12/0891 |
| | | | 711/135 |
| 2015/0186074 A1* | 7/2015 | Benisty | G06F 3/0659 |
| | | | 711/115 |
| 2015/0347264 A1* | 12/2015 | Mohammed | H04L 67/10 |
| | | | 714/45 |
| 2016/0026406 A1* | 1/2016 | Hahn | G06F 3/0656 |
| | | | 711/103 |
| 2016/0070336 A1* | 3/2016 | Kojima | G06F 1/263 |
| | | | 711/103 |
| 2016/0094339 A1* | 3/2016 | Agarwal | H04K 1/00 |
| | | | 711/164 |
| 2016/0179674 A1* | 6/2016 | Sury | G06F 12/0822 |
| | | | 711/141 |
| 2017/0125070 A1* | 5/2017 | Hadar | G11C 5/148 |
| 2018/0074973 A1* | 3/2018 | Chan | G06F 11/00 |
| 2019/0114432 A1* | 4/2019 | Tang | G06F 21/81 |
| 2019/0129850 A1* | 5/2019 | Chang | G06F 12/0246 |

* cited by examiner

DATA STORAGE DEVICE AND METHOD FOR OPERATING NON-VOLATILE MEMORY

CROSS REFERENCE TO RELATED APPLICATIONS

This Application claims priority of Taiwan Patent Application No. 106137606, filed on Oct. 31, 2017, the entirety of which is incorporated by reference herein.

BACKGROUND OF THE INVENTION

Field of the Invention

The present invention relates to data storage devices and methods for operating non-volatile memory.

Description of the Related Art

There are various forms of non-volatile memory (NVM) for long-term data retention, such as flash memory, magnetoresistive RAM, ferroelectric RAM, resistive RAM, spin transfer torque-RAM (STT-RAM), and so on. A non-volatile memory may be combined with a controller to form a data storage device to be accessed by a host.

Considering the wear leveling of the different storage cells of a non-volatile memory, the physical space of a non-volatile memory is dynamically allocated for data storage. Thus, the physical space of the non-volatile memory is dynamically mapped to the host-identified logical addresses. A mapping table is required to manage the mapping relationship between logical addresses at the host side and physical space of the non-volatile memory. When performing data writing, a report showing whether or not the write data was successfully written to the non-volatile memory has to be returned immediately to guarantee the reliability of the mapping table. However, frequent reporting may affect the performance of the non-volatile memory.

BRIEF SUMMARY OF THE INVENTION

A data storage device in accordance with an exemplary embodiment of the disclosure has a non-volatile memory and a controller operating the non-volatile memory. The controller has a microprocessor and a volatile memory. The microprocessor allocates the volatile memory to provide a cache area. According to an asynchronous event request (AER) issued by a host, the microprocessor uses the cache area to collect sections of write data requested by the host, programs the sections of write data collected in the cache area to the non-volatile memory together, and reports failed programming of the sections of write data to the host by asynchronous event request (AER) completion information.

In another exemplary embodiment, a method for operating a non-volatile memory is disclosed, comprising: providing at least one volatile memory; allocating the volatile memory to provide a cache area; issuing an asynchronous event request (AER) by a host; and, according to the asynchronous event request, using the cache area to collect sections of write data requested by the host, programming the sections of write data collected in the cache area to the non-volatile memory together, and reporting failed programming of the sections of write data to the host by asynchronous event request completion information.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
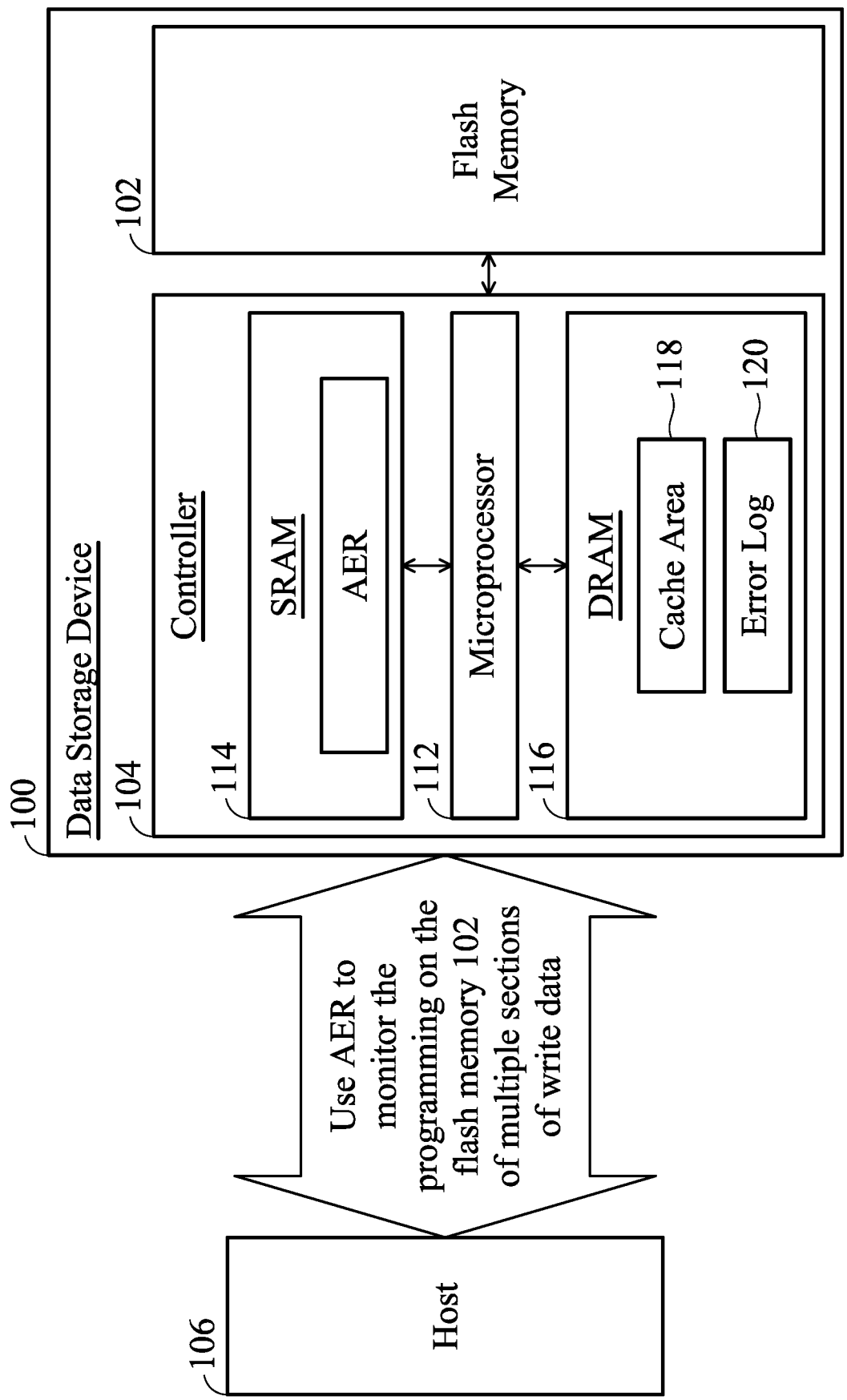
FIG. 1 is a block diagram depicting a data storage device 100 in accordance with an exemplary embodiment of the disclosure.

The following description shows exemplary embodiments of carrying out the invention. This description is made for the purpose of illustrating the general principles of the invention and should not be taken in a limiting sense. The scope of the invention is best determined by reference to the appended claims.

A non-volatile memory for long-term data retention may be a flash memory, a magnetoresistive RAM, a ferroelectric RAM, a resistive RAM, a spin transfer torque-RAM (STT-RAM) and so on. A non-volatile memory may be used to implement a data storage device or a data center. The following discussion is regarding flash memory in particular as an example.

A flash memory is often used as a storage medium in today's data storage devices, for implementations of a memory card, a USB flash device, an SSD and so on. In another exemplary embodiment, a flash memory is packaged with a controller to form a multiple-chip package and named eMMC.

A data storage device using a flash memory as a storage medium can be applied to a variety of electronic devices, including a smartphone, a wearable device, a tablet computer, a virtual reality device, etc. A calculation module of an electronic device may be regarded as a host that operates a data storage device equipped on the electronic device to access a flash memory within the data storage device. The storage media uses a communication interface (or communication protocol) compatible with the host side to exchange or transmit commands or data.

A data center may be built with flash memories as the storage medium. For example, a server may operate an array of SSDs to form a data center. The server may be regarded as a host that operates the SSDs to access the flash memories within the SSDs.

The host distinguishes the flash memory storage contents by logical addresses (for example, according to a logical block address LBA or a global host page number GHP, etc.). A flash memory is generally divided into a plurality of blocks. Each block includes a plurality of pages. Each page may be further divided into several storage units. In order to optimize the use of the flash memory, the physical space of the flash memory is dynamically mapped to the host-identified logical addresses. A mapping table, L2P, is required to manage the mapping relationship between logical addresses at the host side and physical space of the non-volatile memory.

Various operations of the flash memory need to refer to, or may change the contents of the mapping table. For example, the reading of the flash memory needs to refer to the mapping table, and the writing of the flash memory needs to update the mapping table. To reuse a storage space of a flash memory, the dirty space has to be erased in block units. Since there is an upper limit for the erasures that each block can withstand, the issue of wear leveling for flash memory operations needs to be considered. In addition, data updating is not rewriting the same space. The newer version of data is written to a spare space and the old data is regarded as invalid. A block may sporadically retain valid data, so the demand for garbage collection is correspondingly generated. By garbage collection, the sporadic valid data retained in a block is moved to a spare space. The block with only invalid data left can be erased and released for reuse. The techniques of wearing leveling and garbage collection involve mapping table management. Even other technologies that promote the operational efficiency of flash memory may also be related to the mapping table. How to ensure the accuracy of the mapping table without affecting the system efficiency is an important issue in the technical field.

FIG. 1 is a block diagram depicting a data storage device 100 in accordance with an exemplary embodiment of the disclosure. The data storage device 100 has a flash memory 102 and a controller 104. A host 106 is connected to the data storage device 100 to access the flash memory 102 by operating the controller 104.

The controller 104 includes a microprocessor 112, a static random access memory (SRAM) 114 and a dynamic random access memory (SRAM) 116. The (DRAM) 116 is not limited to being combined with the microprocessor 112 in the same package and can be replaced with other storage media. In another exemplary embodiment, the data storage device 100 does not use the dynamic random access memory (DRAM) 116, and uses the static random access memory (SRAM) 114 as the removed dynamic random access memory (DRAM) 116.

In order to achieve the purpose of the present invention, in this case, the microprocessor 112 uses the static random access memory 114 to record an asynchronous event request (AER) issued by the host 106. Due to the AER marked in the static random access memory 114, the microprocessor 112 monitors the execution results of access commands that the host 106 issues to access the flash memory 102. For example, according to a recorded asynchronous event request (AER), an execution result of a write command requested by the host 106 is monitored. The microprocessor 112 further allocates the dynamic random access memory (DRAM) 116 to provide a cache area 118 as well as manages an error log 120. Instead of immediately programming (storing) write data of each write command to the flash memory 102, the microprocessor 112 caches the write data in the cache area 118. When a specific condition is satisfied, the write data is retrieved from the cache area 118 and programmed to the flash memory 102.

When the write data fails to be programmed to the flash memory 102 (e.g. an error occurs during programming the write data cached in the cache area 118 to the flash memory 102), the microprocessor 112 reports the failure to the host 106 by asynchronous event request (AER) completion information which includes the information about the failed programming. When receiving the AER completion information, the host 106 analyzes the AER completion information and executes an appropriate error handling mechanism for this programming failure. Based on the AER design, the host 106 does not need to spend time waiting for the complete execution result of each write command and effectively reduces the latency due to write commands. Thus, data writing of the flash memory 102 is accelerated. Each AER may be paired to one report of AER completion information. Each AER may relate to at least one write command. Each report of AER completion information is preferably generated only when the programming fails.

In addition, the microprocessor 112 records details of the programming failure of the flash memory 102 in the error log 120. The write data failed to be programmed to the flash memory 102 is indicated in the error log 120. The host 106 may request the microprocessor 112 to return the error log 120 to the host 106.

In an exemplary embodiment, the cache area 118 is an always-on region of the dynamic random access memory (DRAM) 116. When an unexpected power-off event occurs, the contents of the cache area 118 do not be lost. After the power is restored, the cached write data is programmed to the flash memory 102 and thereby the programming is completed.

In an exemplary embodiment, when an unexpected power-off event occurs, the microprocessor 112 executes a cache flushing procedure to program the write data cached in the cache area 118 to a particular block of the flash memory 102. After the power is restored, the write data programmed in the particular block may be read and cached back to the cache area 118.

Figure 2:
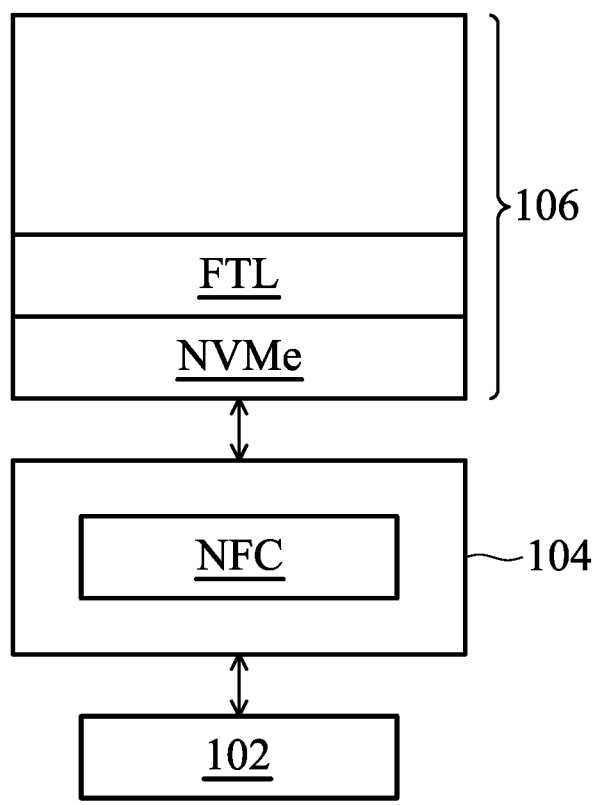
FIG. 2 illustrates an open-channel architecture in accordance with an exemplary embodiment of the disclosure.

FIG. 2 illustrates an open-channel architecture in accordance with an exemplary embodiment of the disclosure. As shown, the host 106 communicates with the controller 104 via a non-volatile memory interface communication protocol NVMe. The controller 104 is electrically connected with the flash memory 102 and provides a NAND flash controller (NFC) to operate the flash memory 102. In the open-channel architecture, the L2P mapping table is managed in a flash translation layer (FTL) of the host 106. Thus, in addition to indicating write data, a write command transmitted by the host 106 further indicates a physical address (rather than a logical address of the write data) allocated for the write data.

This case effectively balances the immediate update of the L2P mapping table and the acceleration of data writing. The aforementioned asynchronous event request (AER) may be defined by the high-speed non-volatile memory interface NVMe, and failure messages of programming may be defined to form the AER completion information. The host 106 sends an asynchronous event request (AER) to the controller 104 through the high-speed non-volatile memory interface NVMe to speed up the execution of write commands and monitor the programming result. In an exemplary embodiment, considering the programming efficiency, the controller 104 halt the programming on the flash memory 102 until accumulates write data to a predefined amount, for example, 16 KB (e.g. one page), or 64 KB (e.g., one super page across 4 blocks). When the programming fails, the controller 104 informs the host 106 of the failure by AER completion information. The host 106 then starts the subsequent error handling mechanism.

After issuing an asynchronous event request (AER), the host 106 may issue a plurality of write commands to the controller 104 corresponding to the AER. Based on the ARE completion information returned from the controller 104, the host 106 is aware of whether the plurality of write commands fails. When a programming error occurs, the host 106 gets the error log 120 from the controller 104 and starts an error handling mechanism. For example, the host 106 issues another write command to operate the controller 104 to program the write data to the newly-allocated physical address. Note that the host 106 also updates the L2P mapping table managed in the flash memory translation layer FTL. The open-channel architecture that manages the mapping table on the host 106 side thus benefits the control of the flash memory 102.

Figure 3A:
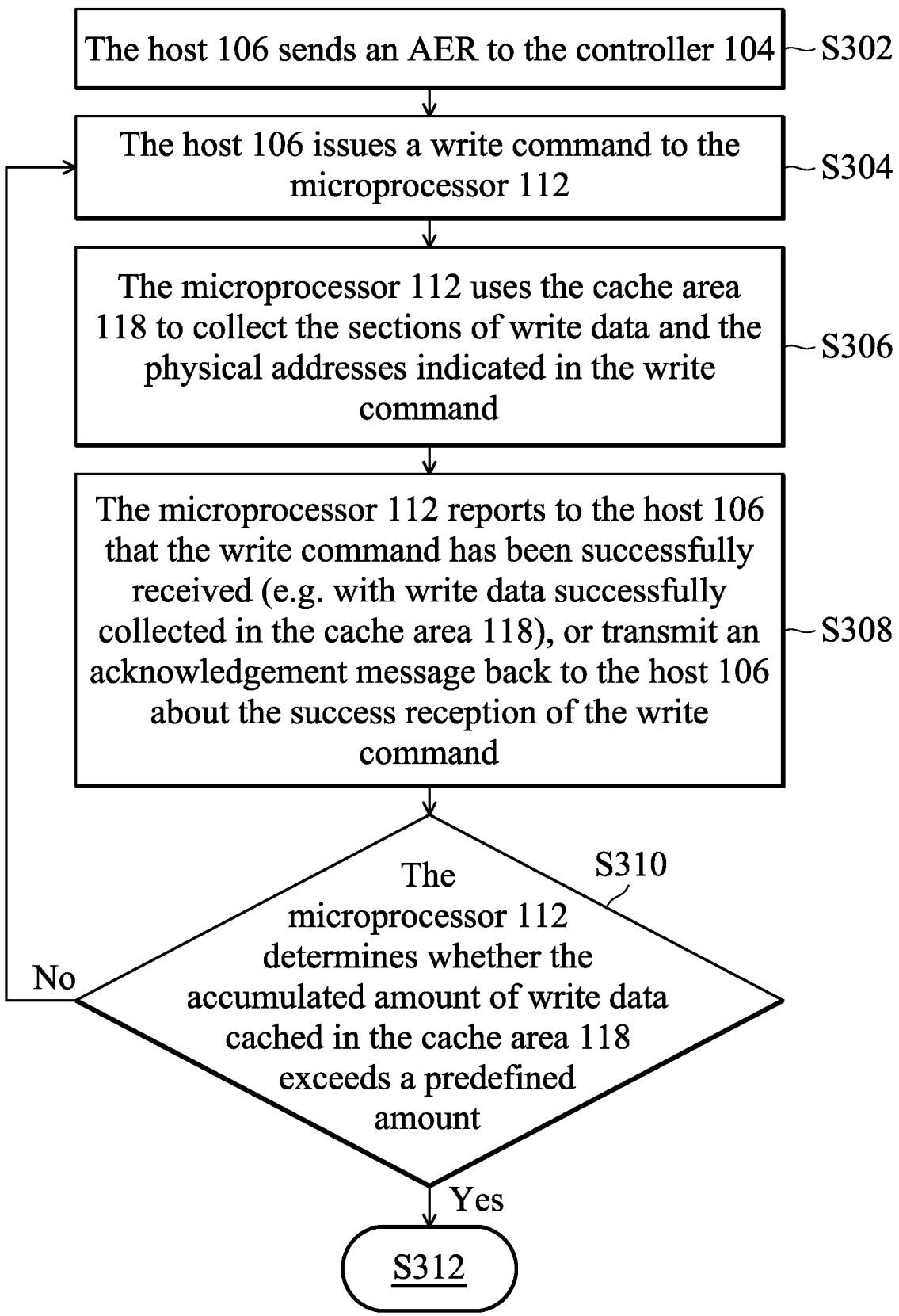
FIGS. 3A and 3B are flowcharts illustrating how the host 106 manages a data writing request.
Figure 3B:
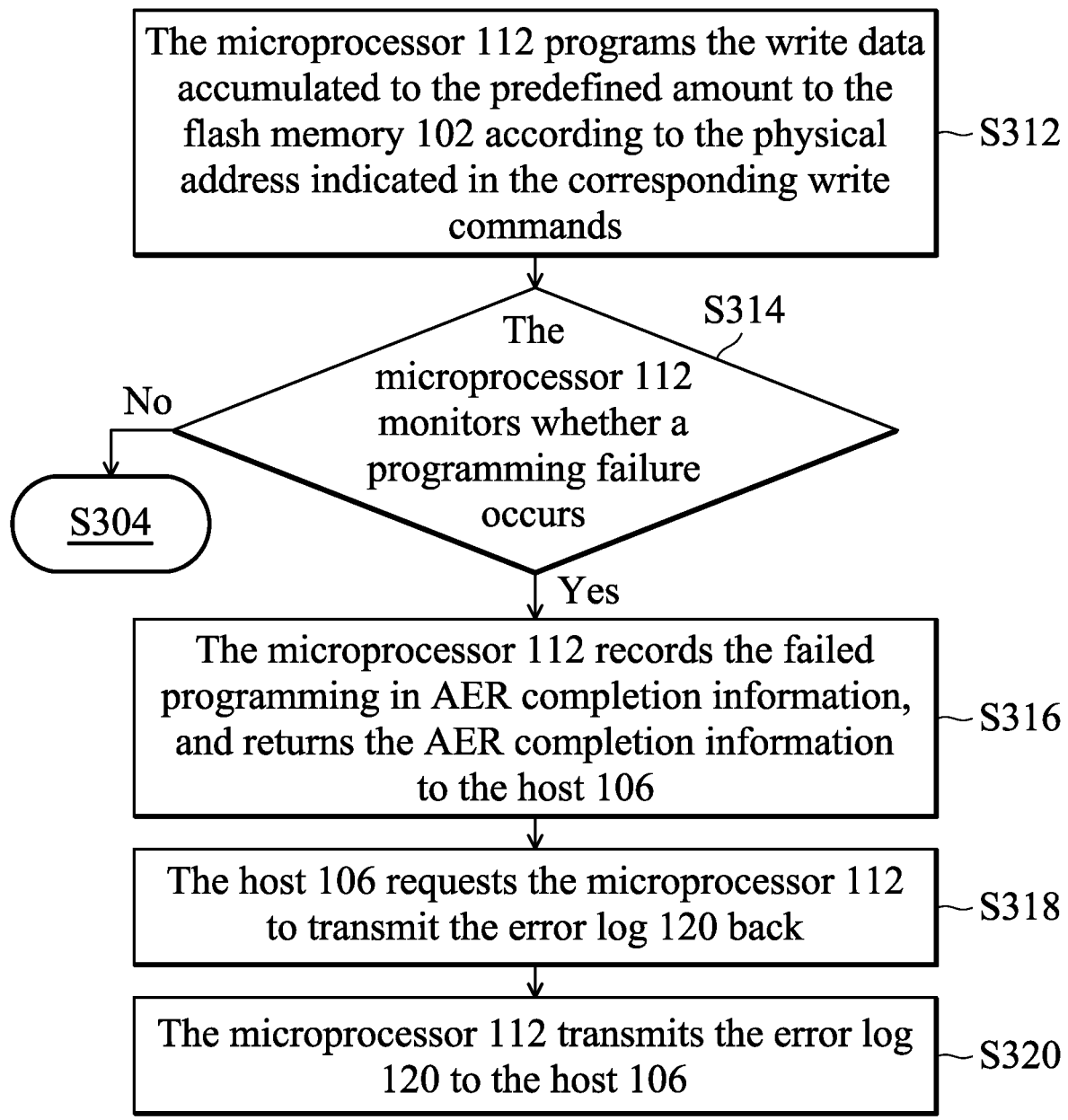

FIGS. 3A and 3B are flowcharts illustrating how the host 106 manages a data writing request. In step S302, the host 106 sends an asynchronous event request (AER) to the controller 104. The microprocessor 112 marks the asynchronous event request (AER) in the static random access memory 114. Due to the marked AER, the controller 104 can use asynchronous event request (AER) completion information to report the failed data programming.

In step S304, the host 106 issues a write command to the microprocessor 112. A write command may indicate at least one section of write data and physical addresses allocated to correspond to the different sections of write data. Each section of write data may be allocated to correspond to one particular physical address. The physical address may indicate a storage unit, a page, or a super page of the data storage device 100.

In step 306, the microprocessor 112 uses the cache area 118 to collect the sections of write data and the physical addresses indicated in the write command.

In step S308, the microprocessor 112 reports to the host 106 that the write command has been successfully received (e.g. with write data successfully collected in the cache area 118). In another exemplary embodiment, the microprocessor 112 may transmit an acknowledgement message back to the host 106 about the success reception of the write command, so that the host 106 proceeds to subsequent operations.

By step S310, the microprocessor 112 determines whether the accumulated amount of write data cached in the cache area 118 exceeds a predefined amount, such as 16 KB (one page). If not, the flow returns to step S304 to process the next write command issued by the host 106. On the contrary, when the accumulated write data exceeds the predefined amount, the flow proceeds to the steps illustrated in FIG. 3B.

Referring to FIG. 3B, in step S312, the microprocessor 112 programs the write data accumulated to the predefined amount to the flash memory 102 according to the physical address indicated in the corresponding write commands. The microprocessor 112 retrieves the write data of the predefined amount from the cache area 118 and programs the retrieved write data of the predefined amount to the flash memory 102. In an exemplary embodiment, four sections of write data (each section containing 4 KB) are retrieved from the cache area 118 and written to the flash memory 102 according to four physical addresses indicated in the corresponding write commands. The four physical addresses may be sequential addresses or indicate the storage cells within the same page.

In step S314, the microprocessor 112 monitors whether a programming failure occurs. If yes, step S316 is performed. The microprocessor 112 records the failed programming in AER completion information, and returns the AER completion information to the host 106.

In step S318, the host 106 requests the microprocessor 112 to transmit the error log 120 back. The host 106 is aware of the programming failure by the AER completion information. For the details of the programming failure, the host 106 requests the microprocessor 112 to transmit the error log 120 back. When receiving the request for the error log 120, the microprocessor 112 may generate the error log 120 and record a command identification number of the failed programming or the physical address of the failed programming in the error log 120. In another exemplary embodiment, the microprocessor 112 generates the error log 120 in step S316 rather than in step S318.

In step S320, the microprocessor 112 transmits the error log 120 to the host 106. Thereafter, the host 106 starts an error handling mechanism. For example, the host 106 outputs another write command to the microprocessor 112 to program the write data of the previously failed programming. Another physical address is indicated in the new write command and the L2P mapping table is updated accordingly.

When the microprocessor 112 determines in step S314 that there is no programming failure, step S304 is performed to process another write command issued by the host 106.

In addition, there are many ways to transfer commands. The first one is direct transfer without using a queue between the host 106 and the microprocessor 112. The second one is indirect transfer, by which the commands are pushed into a submission queue, and then the microprocessor 112 is notified to obtain the commands from the submission queue. When the execution of a command is completed, the microprocessor 112 stacks completion elements in a completion queue. The microprocessor 112 further notifies the host 106 to get the completion elements stacked in the completion queue. Based on the completion elements, the host 106 confirms the execution of the command. The direct or indirect transfer of commands is selected according to the user's needs.

A technique that receives commands from a host, collects write data, programs the collected write data to a non-volatile memory in a series, and uniformly returns the programming result of the collected write data is considered within the scope of the disclosure. Based on the above contents, the present invention further relates to methods for operating a non-volatile memory.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data storage device, comprising:
a non-volatile memory; and
a controller operating the non-volatile memory, including a microprocessor and a volatile memory,
wherein:
the microprocessor allocates the volatile memory to provide a cache area;
according to an asynchronous event request issued by a host, the microprocessor uses the cache area to collect write data of a plurality of write commands requested by the host to a predefined amount, programs the predefined amount of collected write data to the non-volatile memory, and reports failed programming of the predefined amount of collected write data to the host by asynchronous event request completion information;
wherein when programming the predefined amount of collected write data to the non-volatile memory, the microprocessor uses the volatile memory to record an error log to list details of programming errors;
receiving a request from the host;

in response to the request from the host, the microprocessor retrieves the error log from the volatile memory and transmits the error log to the host; and the asynchronous event request completion information is provided to inform the host to transmit the request for getting the error log recorded in the volatile memory.

2. The data storage device as claimed in claim 1, wherein:

the non-volatile memory is a flash memory; and each section of said write data collected in the cache area corresponds to a target space that is allocated by the host; and failed programmed addresses of the non-volatile memory are listed in the error log.

3. The data storage device as claimed in claim 2, wherein:

a mapping table between the flash memory and the host is managed by a flash translation layer of the host.

4. The data storage device as claimed in claim 1, wherein:

the cache area is an always-on area of the volatile memory.

5. The data storage device as claimed in claim 1, wherein:

the microprocessor records the asynchronous event request in the volatile memory.

6. A method for operating a non-volatile memory, comprising:

providing at least one volatile memory;

allocating the volatile memory to provide a cache area;

issuing an asynchronous event request by a host; and according to the asynchronous event request, using the cache area to collect write data of a plurality of write commands requested by the host to a predefined amount, programming the predefined amount of collected write data to the non-volatile memory, and reporting failed programming of the predefined amount of collected write data to the host by asynchronous event request completion information;

wherein when programming the predefined amount of collected write data to the non-volatile memory, using the volatile memory to record an error log to list details of programming errors;

receiving a request from the host; and in response to the request from the host, retrieving the error log from the volatile memory and transmitting the error log to the host;

wherein the asynchronous event request completion information is provided to inform the host to transmit the request for getting the error log recorded in the volatile memory.

7. The method as claimed in claim 6, wherein:

the non-volatile memory is a flash memory; and each section of said write data collected in the cache area corresponds to a target space that is allocated by the host; and failed programmed addresses of the non-volatile memory are listed in the error log.

8. The method as claimed in claim 7, wherein:

a mapping table between the flash memory and the host is managed by a flash translation layer of the host.

9. The method as claimed in claim 6, wherein:

the cache area is an always-on area of the volatile memory.

10. The method as claimed in claim 6, further comprising:

recording the asynchronous event request in the volatile memory.

* * * * *